(12) United States Patent
Lindsay (10) Patent No.: US 12,343,845 B1
(45) Date of Patent: Jul. 1, 2025

(54) VISE JAWS FOR HOLDING IRREGULAR SHAPED OBJECTS

(71) Applicant: Steven J. Lindsay, Kearney, NE (US)

(72) Inventor: Steven J. Lindsay, Kearney, NE (US)

( * ) Notice: Subject to any disclaimer, the term of this patent is extended or adjusted under 35 U.S.C. 154(b) by 385 days.

(21) Appl. No.: 17/857,928

(22) Filed: Jul. 5, 2022

Related U.S. Application Data (63) Continuation-in-part of application No. 17/384,734, filed on Jul. 24, 2021, now Pat. No. 11,945,078, which is a continuation-in-part of application No. 17/369,858, filed on Jul. 7, 2021, now abandoned, which is a continuation-in-part of application No. 17/368,072, filed on Jul. 6, 2021, now abandoned, which is a continuation-in-part of application No. 17/366,603, filed on Jul. 2, 2021, now Pat. No. 11,826,884.

(51) Int. Cl.
*B25B 1/24* (2006.01)
*B25B 1/20* (2006.01)
*B23Q 3/06* (2006.01)

(52) U.S. Cl.
CPC .......... *B25B 1/2452* (2013.01); *B25B 1/2426* (2013.01); *B23Q 3/062* (2013.01); *B25B 1/20* (2013.01); *B25B 1/241* (2013.01); *B25B 1/2436* (2013.01)

(58) Field of Classification Search
CPC ........ B25B 1/2426; B25B 1/20; B25B 1/2452
USPC .......................... 269/258, 267, 266; 279/123
See application file for complete search history.

(56) References Cited

U.S. PATENT DOCUMENTS

| | | | |
|---|---|---|---|
| 1,059,545 A * | 4/1913 | Kunze | B25B 5/163 269/258 |
| 1,256,217 A | 2/1918 | Fieldhouse | |
| 1,405,325 A * | 1/1922 | Posch | B25B 1/2426 269/258 |
| 2,658,415 A | 11/1953 | Nathan et al. | |
| 3,077,346 A | 2/1963 | Lassy | |
| 3,103,353 A | 9/1963 | Lassy | |
| 4,047,709 A | 9/1977 | Thyberg et al. | |
| 4,632,374 A * | 12/1986 | Yang | B25B 1/20 269/261 |
| 5,015,003 A * | 5/1991 | Ramunas | B23B 31/16275 279/154 |
| 5,799,933 A * | 9/1998 | Yang | B25B 1/2426 269/261 |

(Continued)

FOREIGN PATENT DOCUMENTS

| | | | | |
|---|---|---|---|---|
| CN | 2257510 Y | * | 7/1996 | |
| CN | 1314232 A | * | 9/2001 | B25B 1/2426 |

(Continued)

OTHER PUBLICATIONS

Vice for Clamping Irregular Parts; Document ID: CN 218017972 U; Date Published: Dec. 13, 2022; Application No. 2022CN-11092585; Date Filed: Sep. 8, 2022 (Year: 2022).*

(Continued)

*Primary Examiner* — Mahdi H Nejad
(74) *Attorney, Agent, or Firm* — Ryan T. Grace; Advent, LLP (57) ABSTRACT

The invention relates to vise pivotal jaws for holding irregular shaped objects that are removable and modular to work on other prior art vises. The design allows ease of disassembly for cleaning and reassembly.

17 Claims, 9 Drawing Sheets

(56) References Cited

U.S. PATENT DOCUMENTS 5,984,321 A * 11/1999 Gruttadauria ..... B23B 31/16275
                                                279/123

FOREIGN PATENT DOCUMENTS

| CN | 203875648 U | * | 10/2014 |
|----|-------------|---|---------|
| CN | 113814905 A | * | 12/2021 |
| CN | 218017972 U | * | 12/2022 |
| DE | 471674 A    | * | 4/1914  |

OTHER PUBLICATIONS

A Vice Device of Self-levelling; Patent No. 210232726; Document ID: CN 210232726 U; Date Published: Apr. 3, 2020; Inventor: Qian, Zhi-jian; Date Filed: Jul. 24, 2019 (Year: 2020).*
A Fixing Device for Compact Explosion-proof Motor Assembly; Document ID: CN 116566141 B; Date Published: Sep. 12, 2023; Date Filed: Jul. 11, 2023; Inventor: Xu, Xiao-yang (Year: 2023).*
A Bench Vice Jaw Structure of Self-adaptive Deformed Workpiece and Clamping Method Thereof; Patent No. 113814905; Document ID: CN 113814905 A ; Date Published: Dec. 21, 2021; Inventor: Wan, Xia-qi; Date Filed: Oct. 22, 2021 (Year: 2021).*
Positioning Device to Fix a Workpiece; Patent No. 2070655; Patent No. 2070655; Date Published: Jun. 17, 2009; Inventor: Erne Rainer; Date Filed: Dec. 4, 2008 (Year: 2009).*
Rare Antique Fractal Vise, found at: (https://www.youtube.com/watch?v=QBeOgGt_oWU&t=13s ) (Year: 2021).*
Paulin Karl Kunze—Tacky Raccoons (Year: 1913).*
Morphing Fractal Engraving Vise Jaws (Year: 2024).*
Mantle & Co.—History _ VintageMachinery (Year: 1922).*

* cited by examiner

VISE JAWS FOR HOLDING IRREGULAR SHAPED OBJECTS

CROSS-REFERENCE TO RELATED APPLICATIONS

This is a continuation-in-part of U.S. patent application Ser. No. 17/384,734 which was filed on 24 Jul. 2021, which is continuation-in-part of U.S. patent application Ser. No. 17/369,858 which was filed on 7 Jul. 2021, which is a continuation-in-part of U.S. patent application Ser. No. 17/368,072 which was filed on 6 Jul. 2021, which is a continuation-in-part of U.S. patent application Ser. No. 17/366,603 which was filed on 2 Jul. 2021.

BACKGROUND OF THE INVENTION

Field of Invention

The present invention relates to vise jaws for holding irregular shaped objects. The invention also relates to jaws that can be utilized on more than one size of vise by being modular. The invention also relates to construction of the morphing type jaws that can be taken apart easily by the end user for cleaning, reassembly, and for ease of the components being replaced, moved or utilized on other vises.

BACKGROUND OF THE INVENTION

Description of Related Art

The traditional engravers ball vise which has been in existence since the nineteenth century, consists of a ball base resting in a doughnut type cradle. The top half of the ball is made to spin and tilt. On top of the ball are vise jaws. Hand engravers as well as jewelers use this type of vise to hold an object they are working on. The objects that engravers and jewelers need to hold vary in shape and size greatly. Being able to clamp these objects securely for work operations to be carried out is required. Consequently, vise jaws that can hold irregular shaped objects would be most beneficent. U.S. Pat. No. 1,059,545 to Kunze and U.S. Pat. No. 1,405,325 to Posch teach milling machine type vises having nesting shape members, however they are stand alone units. In other words, there is no provision in the design for users to transfer the jaws to other vises. U.S. Pat. No. 1,405,325 to Posch teaches a milling machine type vise having nesting crescent-shaped members, holding pivotal jaws that adjust to the shape of the object being held in the vise when clamped. Referring to U.S. Pat. No. 1,405,325 to Posch, FIG. 3, the nested crescent-shaped members 11, 12, 13, 15, 17 and the pivotal jaws 20, 21 are held together utilizing mating male and female dovetail shapes 22, 23, 24 as illustrated in FIG. 4 (defined as overhanging shoulders and tongue structure in U.S. Pat. No. 1,405,325). A disadvantage to these dovetails is they can break and/or bend if one is over-pivoted and then clamped upon when the vise is tightened. When one does break or bend, it is difficult to repair the damage, as well as to even get them apart after the damage has occurred.

BRIEF SUMMARY OF THE INVENTION

It is the object of this invention to provide vise jaws that can conform to irregular shaped objects, and that are modular, so the user can utilize the jaws on other vises and other vises that are smaller. It is also an object of this invention that the design of the jaws allow ease of disassembly by users for cleaning and reassembly.

BRIEF DESCRIPTION OF THE SEVERAL VIEWS OF THE DRAWINGS

FIG. 6 is a view from the rear that depicts features that can not be seen as well in FIG. 5.

FIG. 8 illustrates how jaws 20 and 21 are aligned and installed onto prior art ball vise 1, in accordance with the present invention.

FIG. 13 illustrates how sub-jaw 65 and sub-jaw 66 are aligned and installed on smaller prior art ball vise 10, in accordance with the present invention.

FIG. 16 is a view from the rear that depicts features that can not be seen as well in FIG. 15.

DETAILED DESCRIPTION OF THE INVENTION

Figure 1:
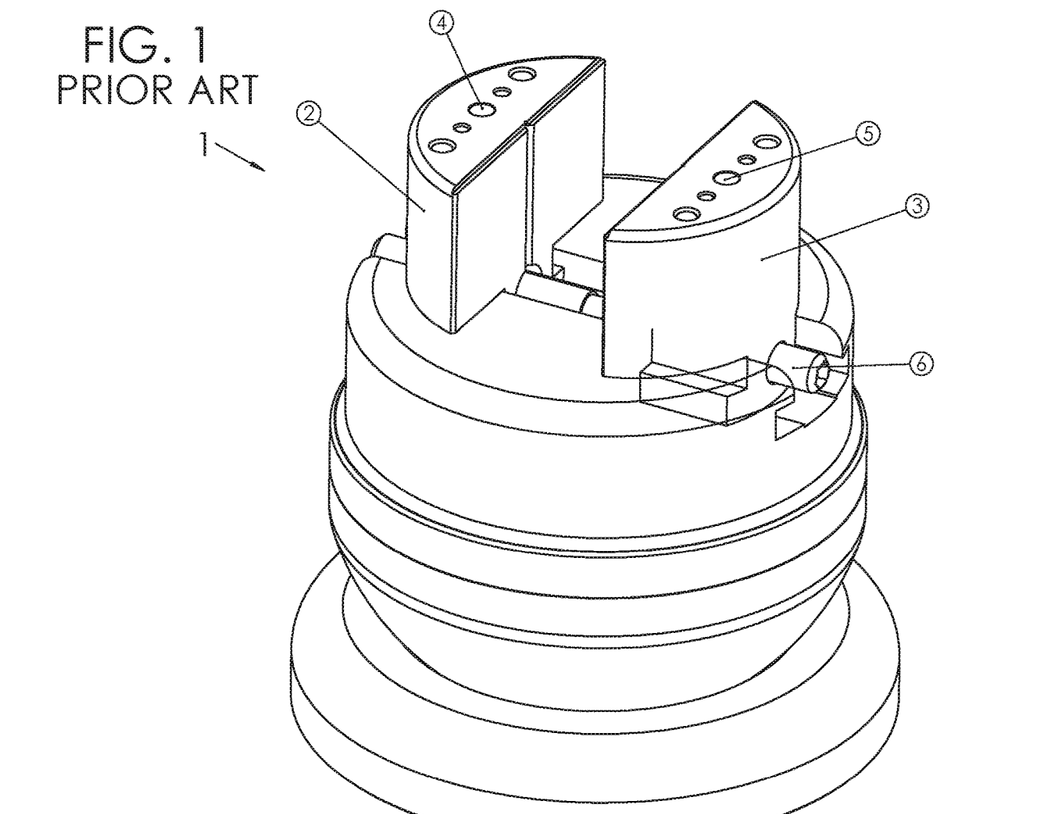
FIG. 1 is an isometric view of a prior art ball vise 1.
Figure 2:
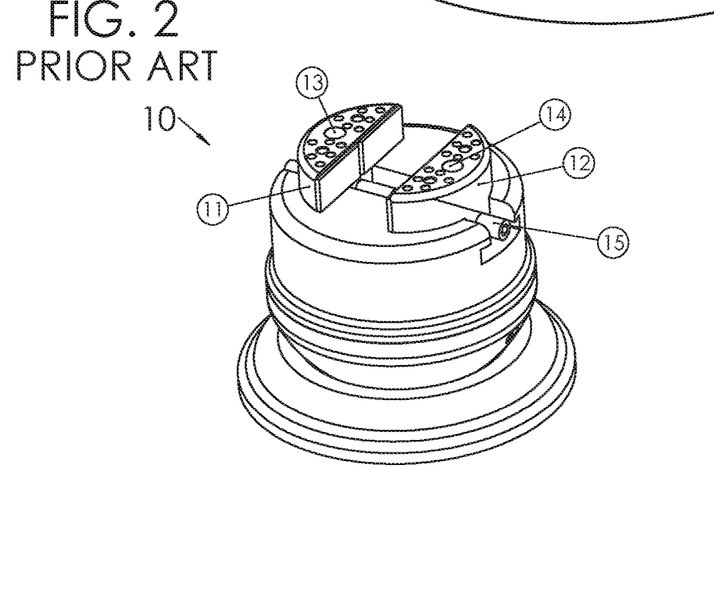
FIG. 2 is an isometric view of a smaller prior art ball vise 10 that is smaller than the prior art ball vise 1 depicted in FIG. 1.

A prior art ball vise 1 is illustrated in FIG. 1. Pertinent features of prior art ball vise 1 are jaw 2, jaw 3, hole 4, hole 5 and screw 6. A user turning screw 6 will open and close jaw 2 and jaw 3 together or apart. A smaller prior art vise 10 is illustrated in FIG. 2. Pertinent features of smaller prior art ball vise 10 are jaw 11, jaw 12, hole 13, hole 14 and screw 15. A user turning screw 15 will open and close jaw 11 and jaw 12 together or apart.

Figure 3:
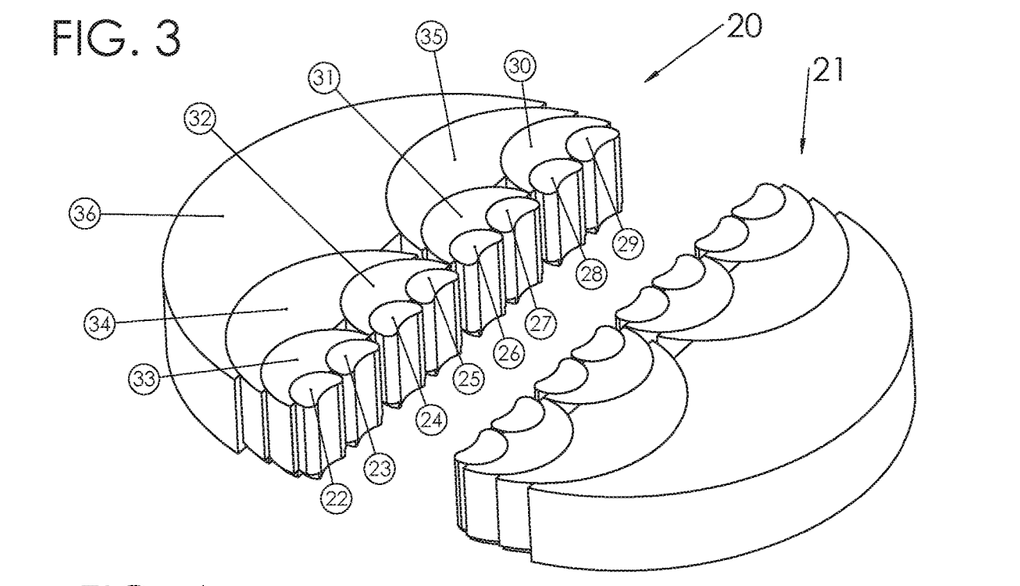
FIG. 3 is a top isometric view of a set of morphing jaws 20 and 21 in accordance with the present invention.
Figure 4:
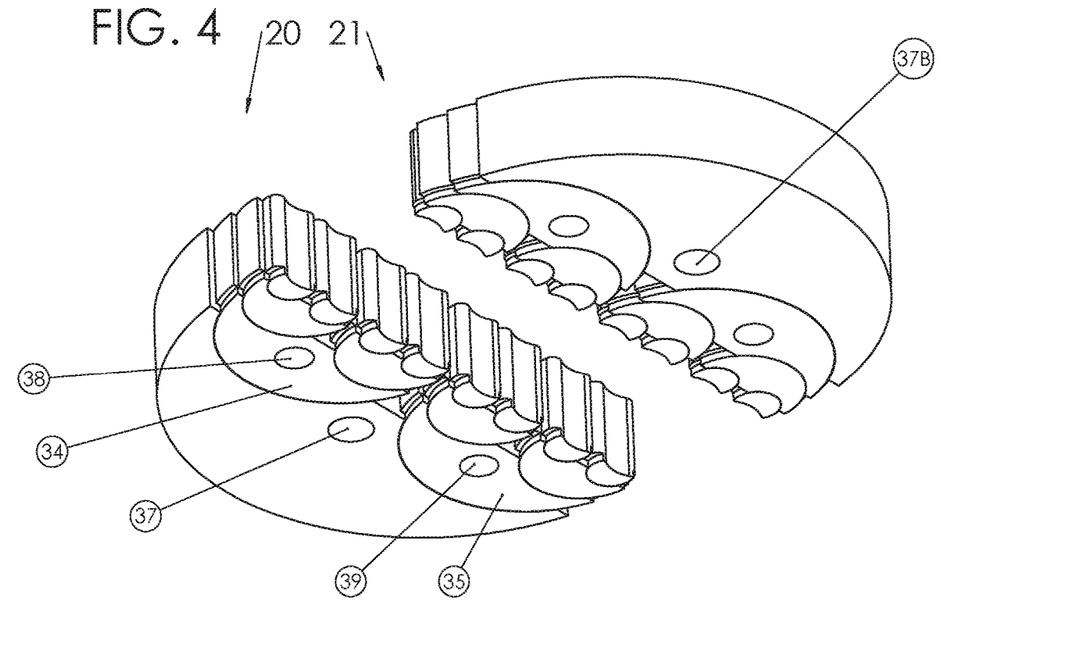
FIG. 4 is a bottom isometric view of the same set of morphing jaws 20 and 21 depicted in FIG. 3 in accordance with the present invention.
Figure 5:
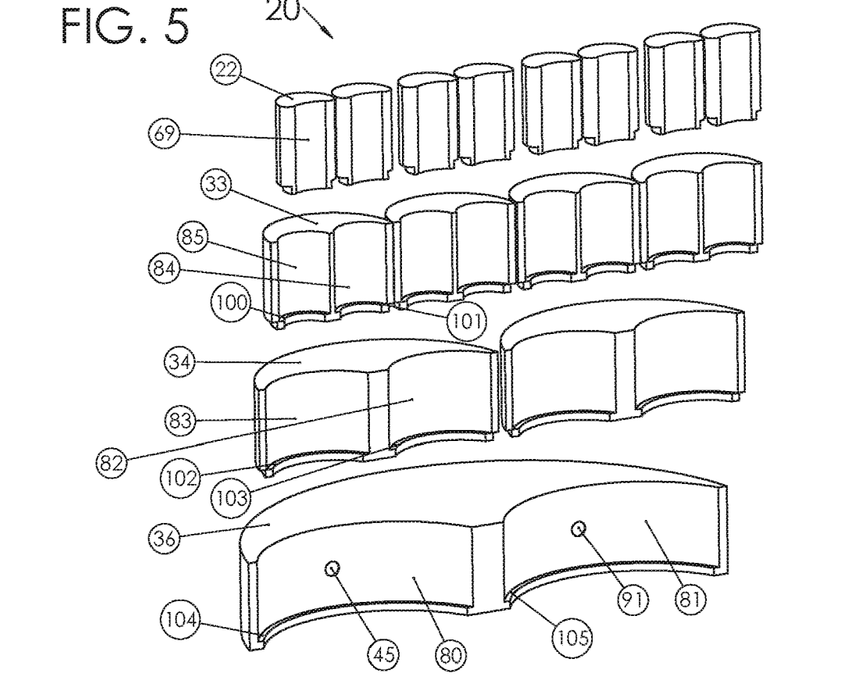
FIG. 5 is an isometric exploded front view of morphing jaw 20 depicted in FIG. 3 and FIG. 4.
Figure 6:
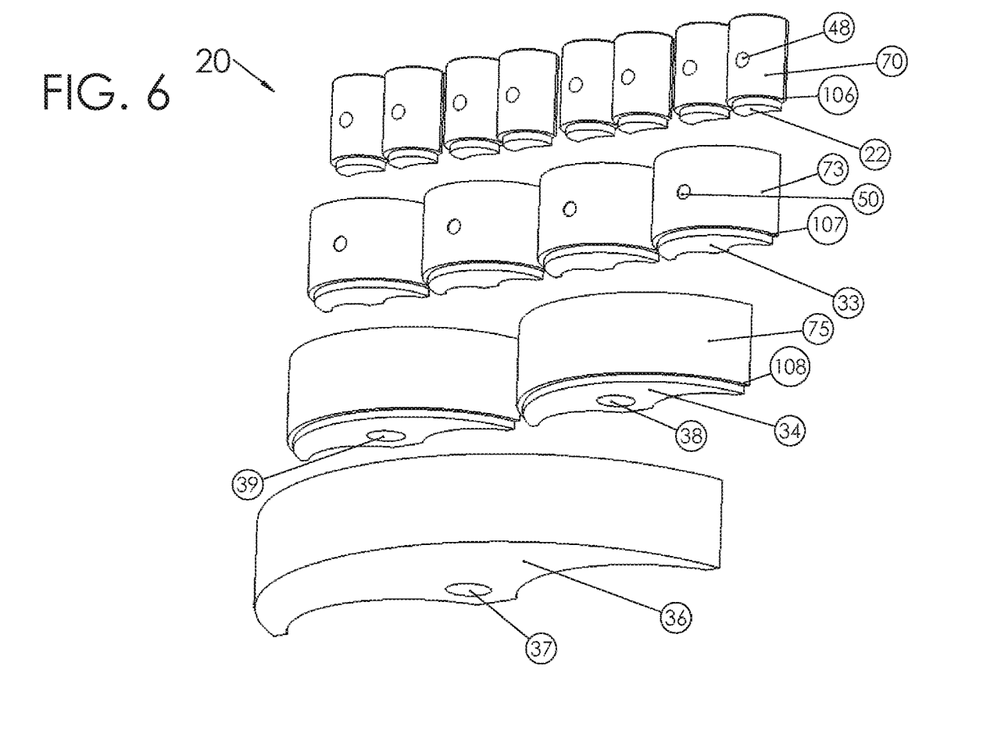
FIG. 6 is an isometric exploded rear view of morphing jaw 20 that is depicted in FIG. 5., in accordance with the present invention.

FIG. 3 and FIG. 4 depict morphing-jaw 20 and morphing-jaw 21 in accordance with the present invention. Morphing-jaw 20 and morphing-jaw 21 are identical to each other and have the same features. FIG. 5 and FIG. 6 illustrate jaw 20 taken apart so that additional featured can be depicted. Morphing-jaw 20 consists of a series of tiers or rows of components nested together. Referring to FIG. 3, a list of nested members of jaw 20 are:

Clamping members 22, 23, 24, 25, 26, 27, 28, 29.
2nd-tier-bow-members 33, 32, 31, 30.
3rd-tier-bow-members 34, 35.
4th-tier-bow-member 36.

The first tier are clamping members, the second, third, and forth tiers are members that are bow shaped members. FIG. 3 and FIG. 4 depict the tiers in their center position.

In each level of tier, the members of that tier have identical features. In the following applicant will describe the first member of each tier and how they work and nest together with the first members from adjoining tiers. The remaining members of each tier fit and nest together in the same manner.

Referring to FIG. 6 and FIG. 5, features to the member of the first tier is clamping member 22. Clamping member 22 features consists of a clamping surface 69, a radius-surface 70, a magnet 48, and a first-tier-downward-facing-ledge 106. Clamping surface 69 (FIG. 5) is the surface that contacts against an object that is being clamped. Clamping surface 69 can be shaped similarly to how it is depicted in the figures or it could be flat or it could be another shape without departing from the scope of the invention. Referring to FIG. 6, magnet 48 is rigidly fastened flush or just below flush of radius-surface 70.

Referring to FIG. 3, the second tier or row that are identical to each other are 2nd-tier-bow-members 33, 32, 31, 30. Referring to FIG. 5 and FIG. 6, 2nd-tier-bow-member 33 features consists of an radius-surface 73, a second-tier-downward-facing-ledge 107, a magnet 50 rigidly fastened flush or just below flush radius-surface 73, a 1st-concave-surface 85 having a second-tier-upward-facing-ledge 100, and a 2nd-concave-ledge 84 having a second-tier-upward-facing-ledge 101.

Referring to FIG. 3, the third tier that are identical to each other are 3rd-tier-bow-members 34, 35. Referring to FIG. 5 and FIG. 6, 3rd-tier-bow-member 34 features consists of a radius-surface 75, a third-tier-downward-facing-ledge 108, a 1st-concave-surface 83 having a third-tier-upward-facing-ledge 102, and a 2nd-concave-surface 82 having a third-tier-upward-facing-ledge 103. Referring to FIG. 4 bow-shape-members 34 and 35 also includes dowel-pin hole 38 and dowel-pin hole 39, respectfully.

Referring to FIG. 3, the fourth tier consists of a single member, 4th-tier-bow-member 36. Referring to FIG. 5 and FIG. 6 4th-tier-bow-member 36 features consists of a 1st-concave-surface 80 having an inner-magnet 45 that rigidly fastened flush or just below the surface of 1st-concave-surface 80, a fourth-tier-upward-facing-ledge 104, a 2nd-concave-surface 81 having an inner-magnet 91 that is flush or just below the surface of 2nd-concave-surface 81, and a fourth-tier-upward-facing-ledge 105. Referring to FIG. 4 4th-tier-bow-member 36 also includes dowel-pin hole 37, and identified in morphing-jaw 21 (FIG. 4) as dowel-pin hole 37B.

Operation

The tiers or rows of the nested components of morphing jaw 20 fit and interact together as follows. Referring to FIG. 5 and FIG. 6, radius-surface 70 of clamping member 22 is made to fit in 1st-concave-surface 85 of 2nd-tier-bow-members 33 with a fit that allows the two surfaces to slide. Magnet 48 that is rigidly mounted into radius-surface 70 will hold clamping member 22 within 1st-concave-surface 85 that is made of or that incorporates metal having iron. Clamping member 22 is prevented from sliding downward in relation to 2nd-tier-bow-member 33 any further than it is depicted in FIG. 3 when first-tier-downward-facing-surface 106 sets on and is in contact with second-tier-upward-facing-ledge 100. In other words, second-tier-upward-facing-ledge 100 keeps clamping member 22 from sliding downward since first-tier-downward-facing-ledge 106 will catch and ride on second-tier-upward-facing-ledge 100. It should be noted that clamping member 22 is illustrated in the figures with a recess cut or groove to form a partial lip surface and is being identified as "first-tier-downward-facing-ledge 106". An equivalent to this is to have no recess cut or groove but to just use the end surface of clamping member 22 for the surface "first-tier-downward-facing-ledge 106". If desired the overall part length could be made shorter then so that the top of clamping member 22 sets flush with the top of 2nd-tier-bow-member 33. It is noted that clamping members 22, 23, 24, 25, 26, 27, 28, 29 can be made of a material made of metal, or a softer material such as brass, copper or plastic.

Referring to FIG. 5 and FIG. 6, radius-surface 73 of 2nd-tier-bow-member 33 is made to fit in 1st-concave-surface 83 of 3rd-tier-bow-member 34 with a fit that allows the two surfaces to slide. Magnet 50 is rigidly mounted into radius-surface 73 that will hold 2nd-tier-bow-member 33 within 1st-concave-surface 83 of third-tier-bow-member 34. 2nd-tier-bow-member 33 is prevented from sliding downward in relation to 3rd-tier-bow-member 34 any further than it is depicted in FIG. 3 when second-tier-downward-facing-ledge 107 sets on and is in contact with third-tier-upward-facing-ledge 102. In other words, third-tier-upward-facing-ledge 102 keeps 2nd-tier-bow-member 33 from sliding downward since second-tier-downward-facing-ledge 107 will catch and ride on third-tier-upward-facing-ledge 102.

Referring to FIG. 5 and FIG. 6, radius-surface 75 of 3rd-tier-bow-member 34 is made to fit in 1st-concave-surface 80 of 4th-tier-bow-member 36 with a fit that allows the two surfaces to slide. Inner-magnet 45 is rigidly mounted into 1st-concave-surface 80 that will hold 3rd-tier-bow-member 34 within 1st-concave-surface 80 of 4th-tier-bow-member 36. 3rd-tier-bow-member 34 is prevented from sliding downward in relation to 4th-tier-bow-member 36 any further than it is depicted in FIG. 3 when third-tier-downward-facing-ledge 108 sets on and is in contact with fourth-tier-upward-facing-ledge 104. In other words, fourth-tier-upward-facing-ledge 104 keeps 3rd-tier-bow-member 34 from sliding downward since third-tier-downward-facing-ledge 108 will catch and ride on fourth-tier-upward-facing-ledge 104.

Figure 7:
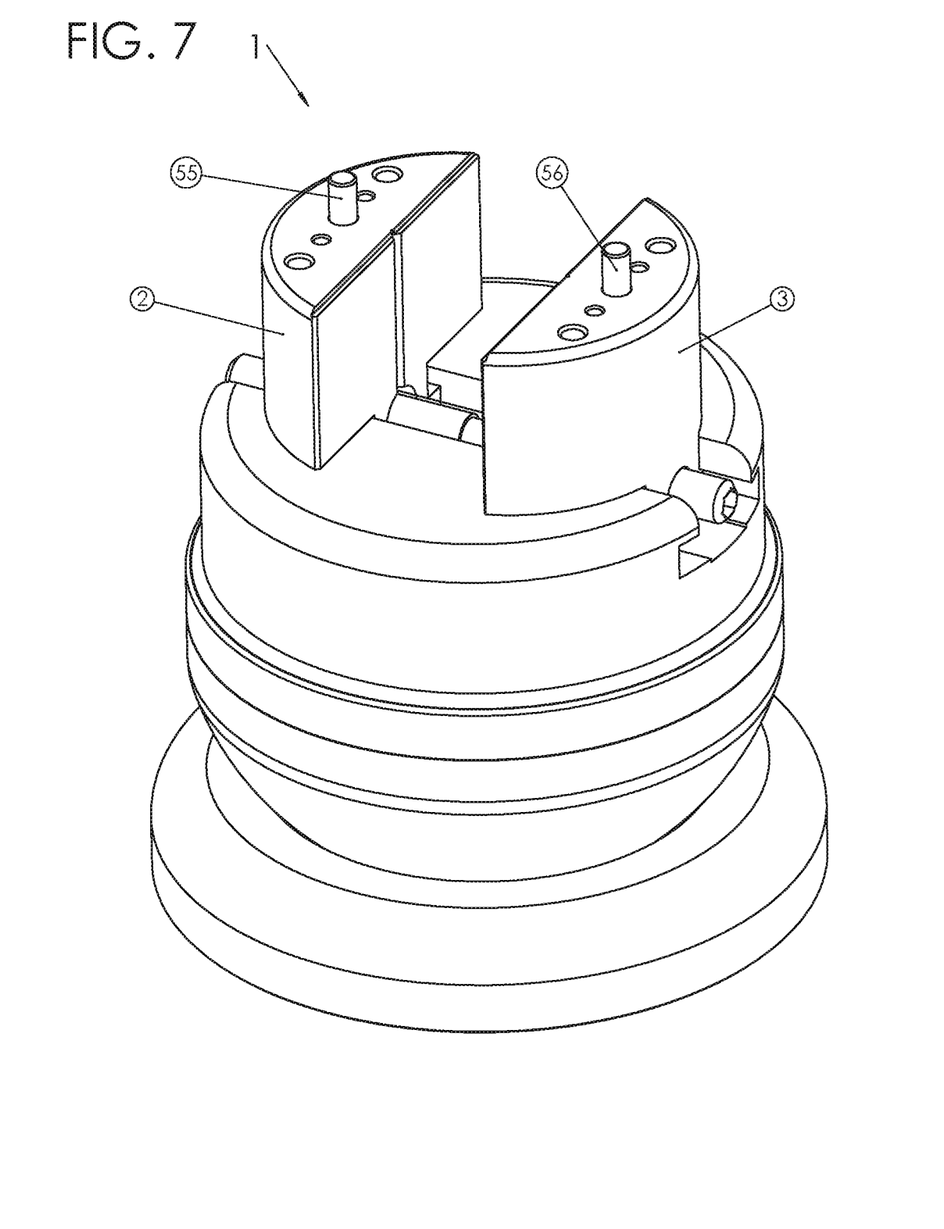
FIG. 7 is an isometric view of the same prior art ball vise 1 depicted in FIG. 1, but differing in that a dowel pin 55 have been inserted into hole 4 (FIG. 1) and that a dowel pin 56 has been inserted in hole 5 (FIG. 1).

In accordance with the present invention the process of installing and using morphing jaws 20 and 21 (FIG. 3, FIG. 4) on a prior art vise that the end user can carry out is: Referring to FIG. 7 illustrates prior art ball vise 1. Dowel pin 55 and dowel pin 56 are installed into the existing jaws on prior art ball vise 1. Please note that most traditional prior art ball vises that engravers and jewelers use have for over a century pin holes on the top of their jaws for accepting dowel pins as depicted. Prior art vises that do not have this hole feature for a dowel pin in each jaw may be drilled to fit dowel pins. For prior art vises that have pin holes on the top of their jaws, but the pin holes are a different size of what dowel pin 55 and dowel pin 56 are: For this situation stepped pins that have a larger diameter on one end and a smaller diameter on their other end can be utilized.

Figure 8:
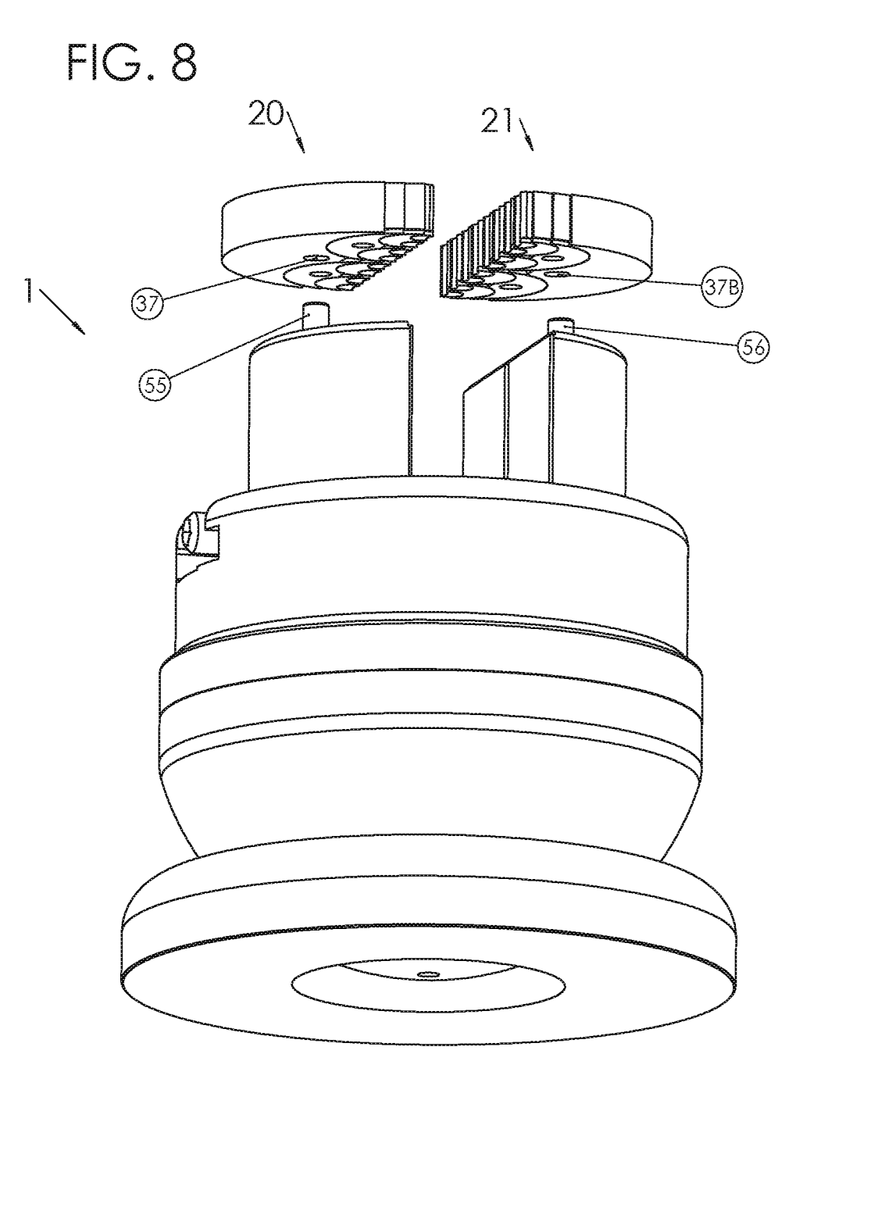
FIG. 8 is a lower view of the same prior art ball vise 1 depicted in FIG. 7 together with morphing jaws 20 and 21 depicted in FIG. 4 and FIG. 5.
Figure 9:
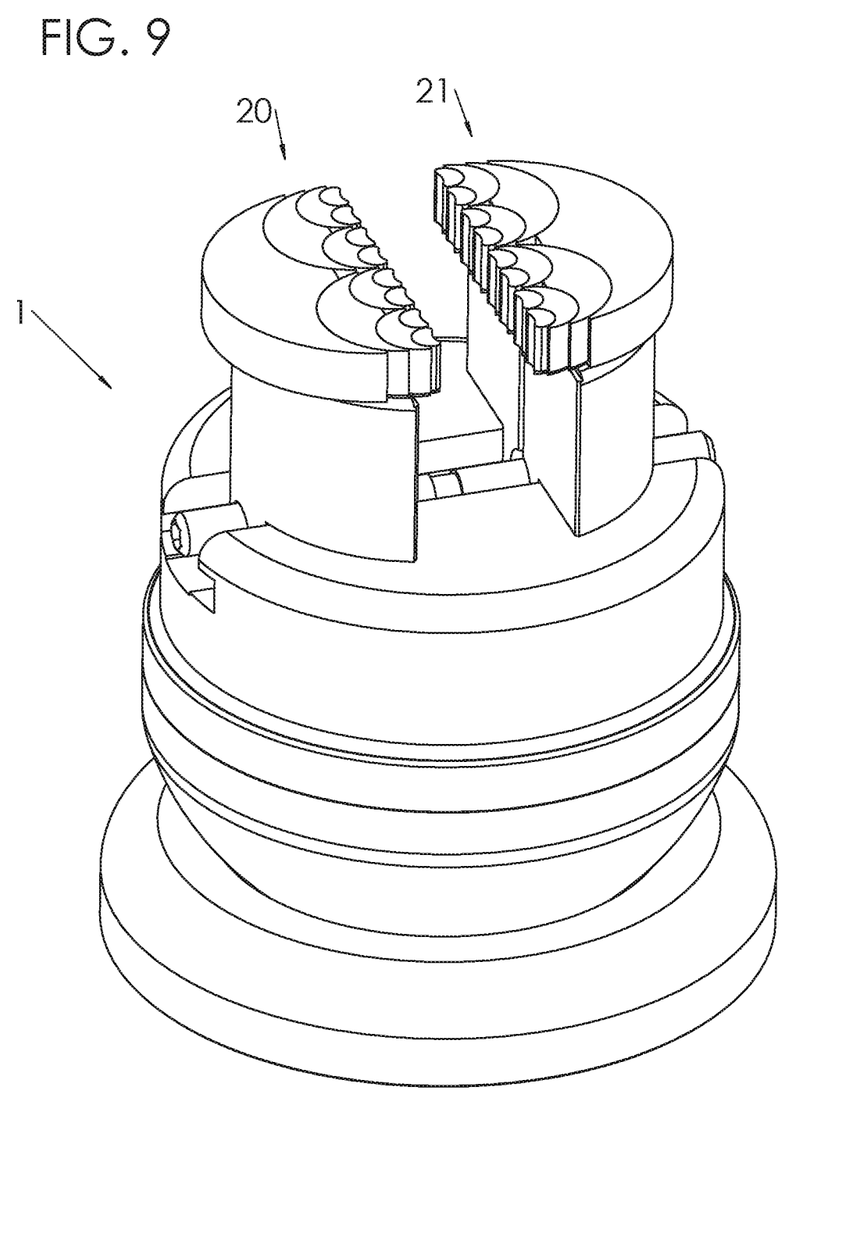
FIG. 9 is an isometric view depicting morphing jaws 20 and 21 after they have been installed on prior art ball vise 1, in accordance with the present invention.
Figure 10:
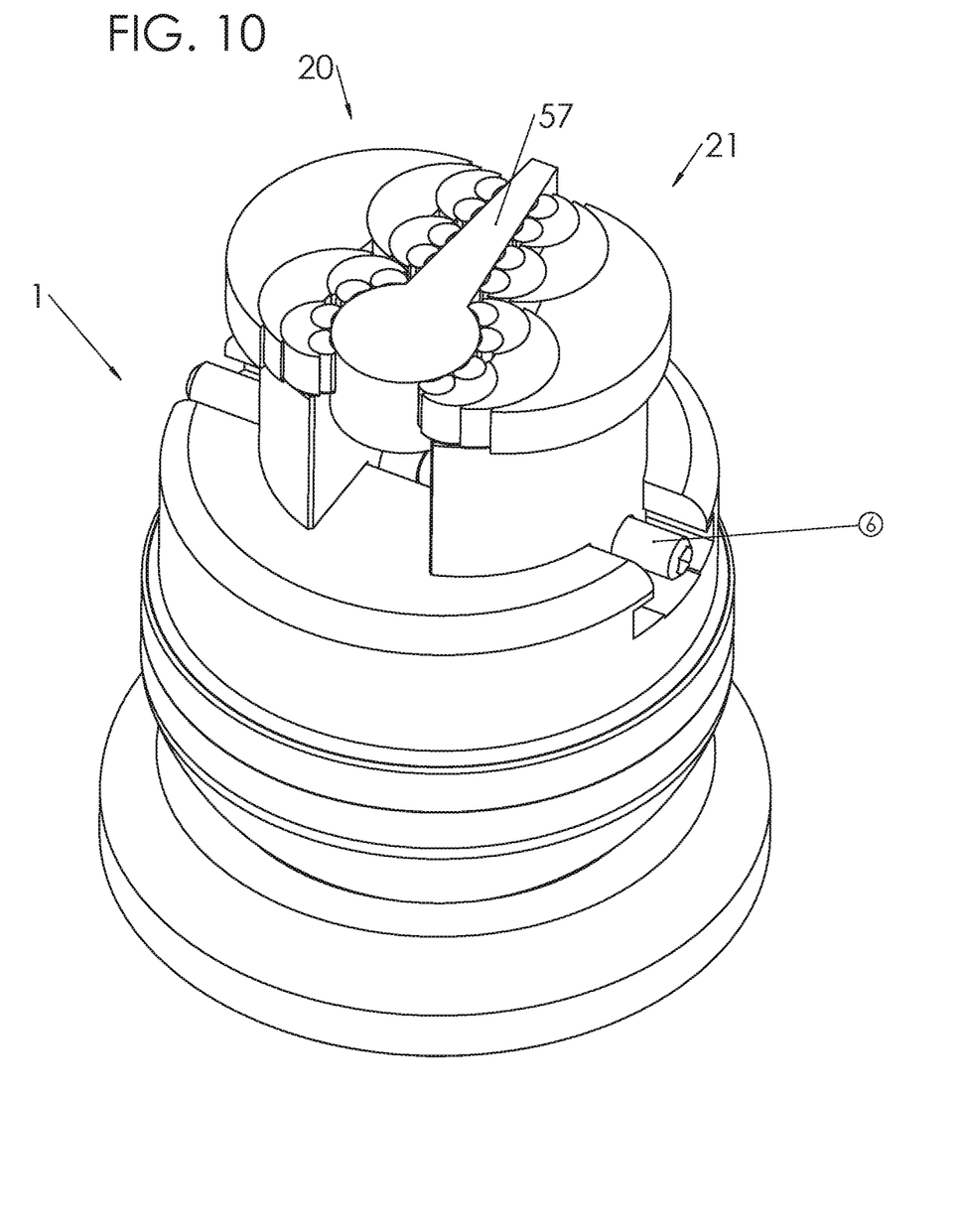
FIG. 10 is an isometric view depicting morphing jaws 20 and 21 after they have been installed on prior art ball vise 1, and an irregular shaped object 57 has been clamped in morphing jaws 20 and 21 showing how morphing jaws 20 and 21 will conform to the shape of the irregular shaped object 57, in accordance with the present invention.

FIG. 8 illustrates morphing jaws 20 and 21 being aligned in order to be installed. Dowel pin 55 is aligned with dowel pin hole 37 in morphing jaw 20 and dowel pin 56 is aligned with dowel pin hole 37B for morphing jaw 21. FIG. 9 depicts morphing jaws 20 and 21 installed on prior art ball vise 1 and ready for use. Morphing jaw 20 can pivot freely on dowel pin 55 and morphing jaw 21 can pivot freely on dowel pin 56. The figures illustrate the outer surface of 4th-tier-bow-member 36 in the form of a convex radius surface, however this surface could be another shape since the rotation pivot support for 4th-tier-bow-member 36 is done with dowel pin hole 37 and dowel pin 55. FIG. 10 illustrates how morphing jaws 20 and 21 will conform to the shape of irregular shaped object 57 when the irregular shaped object 57 is held between morphing-jaws 20 and 21 and screw 6 is closed to bias morphing-jaws 20 and 21 together. In accordance with the present invention morphing-jaws 20 and 21 can be disassembled easily by a user for cleaning. Simply pulling a member in the direction away from the concave-surface of another member allows the magnetism of the magnet to be overcome for the member to separate. The members sliding surfaces can then be wiped off by the user and then reassembled.

Figure 11:
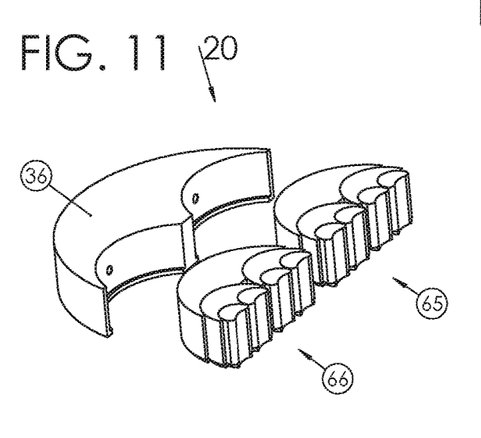
FIG. 11 is an isometric view of the morphing jaw 20 and how 4th-tier-bow-member 36 can be removed leaving sub-jaw 65 and sub-jaw 66 that can then be utilized by the user on smaller prior art vises, in accordance with the present invention.
Figure 12:
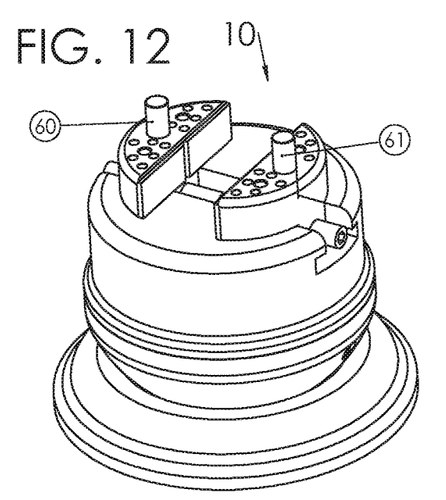
FIG. 12 is an isometric view of the same prior art ball vise 10 depicted in FIG. 2, but differing in that a dowel pin 60 has been inserted into hole 13 (FIG. 2) and that a dowel pin 61 has been inserted in hole 14 (FIG. 2).
Figure 13:
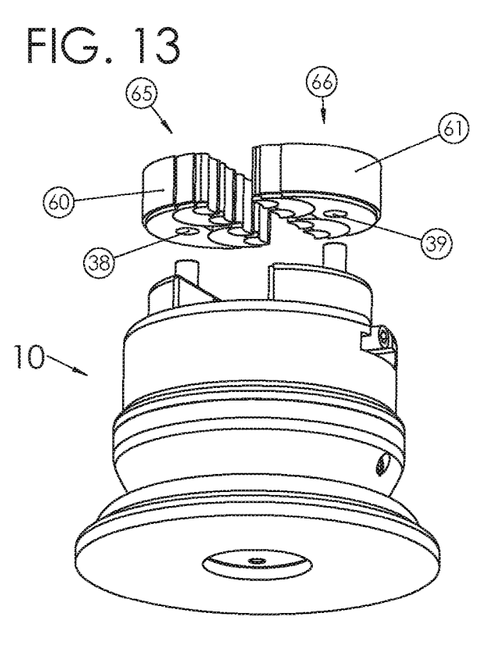
FIG. 13 is a lower isometric view of the same prior art ball vise 10 depicted in FIG. 12 together with sub-jaw 65 and sub-jaw 66 depicted in FIG. 11.
Figure 14:
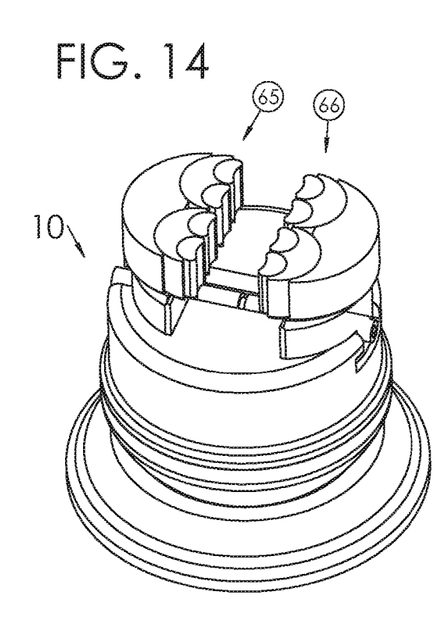
FIG. 14 is an isometric view depicting sub-jaw 65 and sub-jaw 66 depicted in FIG. 11 after they have been installed on prior smaller art ball vise 10, in accordance with the present invention.

In accordance with the present invention morphing jaws 20 and 21 can be utilized on other vises, and other vises that are smaller. For prior art vises that are smaller the process is as follows. FIG. 11 depicts morphing jaw 20 with 4th-tier-bow-member 36 pulled away leaving sub-jaw 65 and sub-jaw 66. FIG. 12 is a view of smaller prior art ball vise 10 with dowel pin 60 and dowel pin 61 installed into the jaws of smaller prior art ball vise 10. FIG. 13 illustrates sub-jaw 65 and sub-jaw 66 being aligned and ready to be install on smaller prior art ball vise 10. Dowel pin 60 is aligned with dowel pin hole 38 in sub-jaw 65 and dowel pin 61 is aligned with dowel pin hole 39 for sub-jaw 66. When installed sub-jaw 65 can pivot on dowel pin 60 and sub-jaw 66 can pivot on dowel pin 61. FIG. 14 depicts morphing sub-jaw 65 and sub-jaw 66 installed on smaller prior art ball vise 10 and ready for use.

Figure 15:
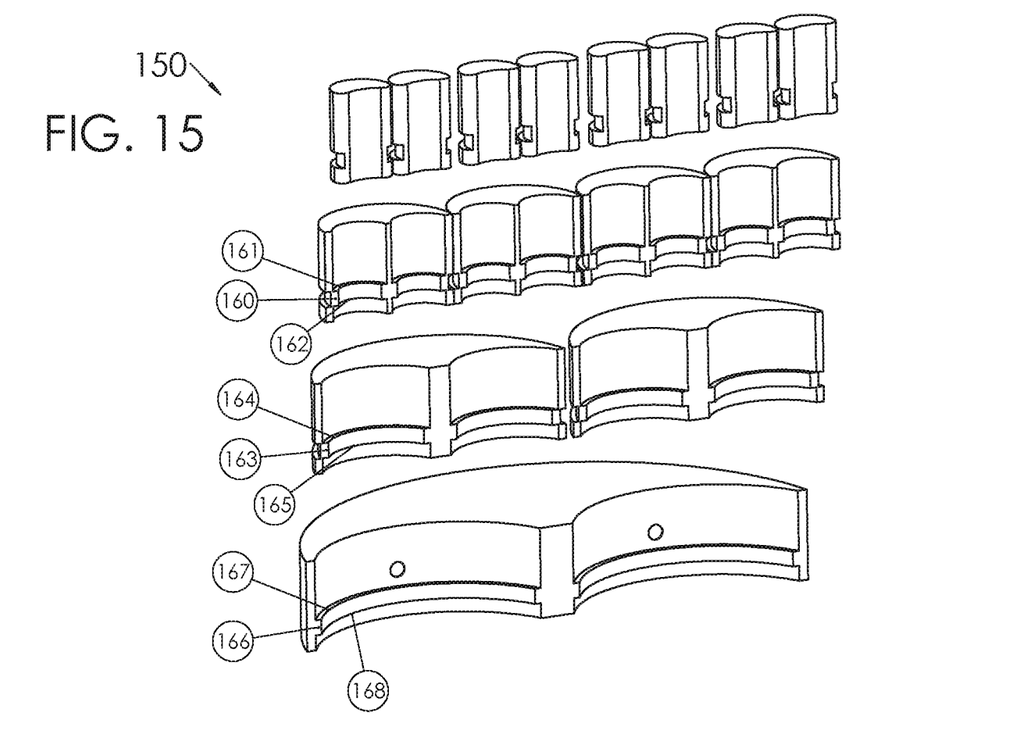
FIG. 15 is an isometric exploded front of another embodiment morphing jaw 150 in accordance with the present invention
Figure 16:
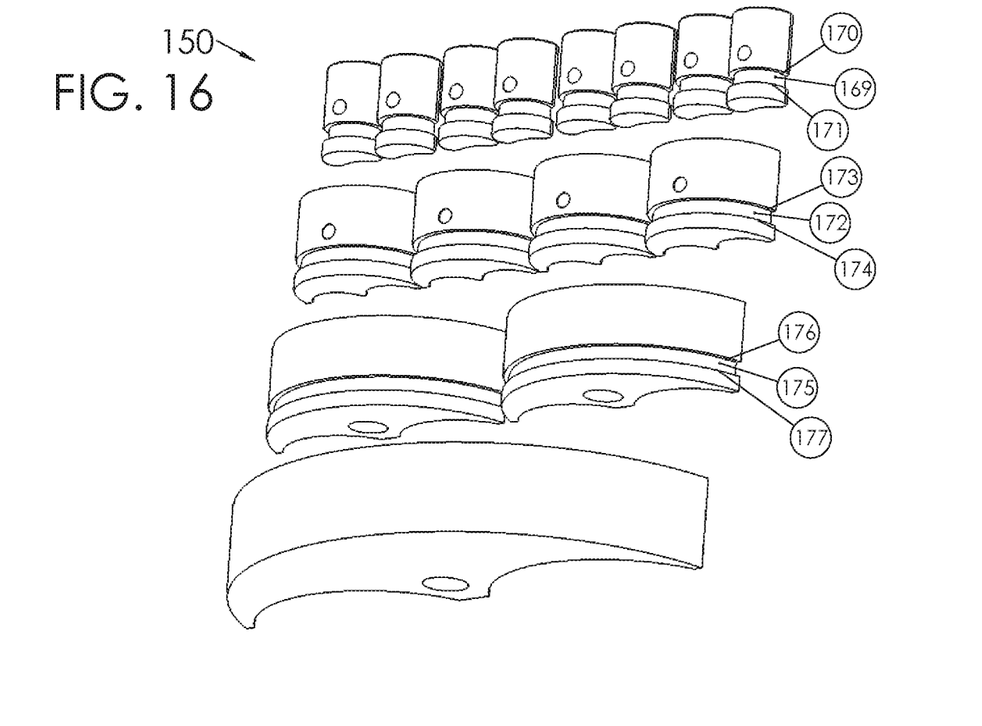
FIG. 16 is an isometric exploded rear view of morphing jaw 150 in accordance with the present invention.

As described above and illustrated the figures morphing jaws 20 and 21 uses downward-facing-ledges on the outside radius of members, together with upward-facing-ledges on the concave side of members to keep members from sliding down past their flush alignment as illustrated in FIG. 3 and FIG. 4, however they are free to slide upward with the design. While allowing upward movement can help in disassembly, it may be desirable for an alternate design to keep them from sliding up or down as is illustrated in FIG. 15 and FIG. 16 by utilizing additional sets of downward-facing-ledges and upward-facing-ledges for the purpose. Referring to FIG. 15 and FIG. 16 morphing jaw 150 has similar tiers and uses magnets like morphing jaw 20 in FIG. 3 and FIG. 4, however morphing jaw 150 keeps the members aligned by the use of grooves 169, 172, 175 (FIG. 16) that are on the outside radius of members. Grooves 169, 172, 175 are made a size for a sliding fit over raised rings 160, 163, 166 (FIG. 15) respectful in the concave-surface of the members. With the raised rings in the grooves the members are retained from moving upward or downward, but yet they are free to slide rotationally. In FIG. 15 and FIG. 16 the first member of each tier have their grooves and ridges identified. The remaining members of each tier are identical to the first. Similar to morphing jaw 20 (FIG. 5 and FIG. 6) morphing jaw 150 (FIG. 15 and FIG. 16) upward-facing-ledges and downward-facing-ledges are utilized for keeping the members aligned from moving downward, however morphing jaw 150 has twice the number of upward-facing-ledges and downward-facing-ledges. The additional ledges keep members also aligned from moving upward. The ledges are on either side in the grooves and on either side of the raised rings and are described and interact as follows:

When the members are assembled raised-ring 160 is within groove 169 with its upward-facing-ledge 161 in contact with downward-facing-ledge 170, and with its downward-facing-ledge 162 in contact with upward-facing-ledge 171.

Raised-ring 163 is within groove 172 with its upward-facing-ledge 164 in contact with downward-facing-ledge 173, and with its downward-facing-ledge 165 in contact with upward-facing-ledge 174.

Raised-ring 166 is within groove 175 with its upward-facing-ledge 167 in contact with downward-facing-ledge 176, and with its downward-facing-ledge 168 in contact with upward-facing-ledge 177.

Conclusion, Ramifications, and Scope

Accordingly, the reader will see that the present invention provides users an opportunity to allow them to retro-fit their prior art vise to use morphing jaws that can conform to irregular shaped objects. The unique morphing jaws are modular so the user can utilize the jaws on other prior art vises and other prior vises that are smaller. The invention allows ease of disassembly by users for cleaning and also reassembly. Since there is not a delicate dovetail used such as in U.S. Pat. No. 1,405,325 to Posch, the problems with members jamming or a piece of a dovetail breaking is eliminated.

Although the invention has been described with reference to the various embodiments, it should be noted that equivalents may be employed and substitutions made therein without departing from the scope of the invention as recited in the claims. For example: Applicant has illustrated ball vises for the prior art vises to place the morphing jaws on, however the invention jaws can be utilized on other type of prior art vises. Dowel pins are illustrated and used to pivot the last single tier of the jaw, however the last single tier can instead be rigidly mounted without departing from the present invention. The fewer tiers used the less shaping the jaw clamping members can adjust to conform, however even with a set of two tiers the method still provides benefits of working to conform without departing from the present invention. In other words, a two tier morphing jaw example is: clamping members 22 and 23 nested in 2nd-tier-bow-member 33. A dowel pin hole for attaching to a prior art vise would then be added to the bottom of 2nd-tier-bow-member 33 for it to pivot on. Another equivalent is rather than the use of magnets to bias the members together, a wire spring arrangement could be employed between the members together with a slot or groove for the wire to hook into. Another equivalent example is the size of hole 13 and hole 14 (FIG. 8), can be larger than the size that they are illustrated, as can dowel pin 55 and dowel pin 56 (FIG. 8) be larger than the size that they are illustrated, as can dowel pin hole 38 and dowel pin hole 39 (FIG. 13) be larger than the size that they are illustrated, as can dowel pin 60 and dowel pin 61 (FIG. 13) be larger than the size that they are illustrated. Another equivalent example is bow-shape-member 36 and dowel pin 55 could be made as one solid piece rather than two separate parts. Another equivalent example is dowel pin 55 could instead be a screw that used through bow-shape-member 36 and threaded into the top of a prior art vise jaw such as jaw 2 (FIG. 1). Such a screw would eliminate dowel pin 55 (FIG. 7). Or such a screw could be combined with dowel pin 55 by making dowel pin 55 hollow for the screw to go through and to be configured to allow bow-shape-member to pivot. Applicant has been a hand engraver for 46 years and has worked with many vise jaw designs. Therefore the field of the invention use for the applicant is hand engraving and jewelry making fields, however the invention can be utilized in other fields that also use a vise. Accordingly, the scope of the invention should be determined not by the embodiments illustrated, but by the appended claims and their legal equivalents.

What is claimed is:

1. A morphing jaw for use with a vise, the morphing jaw comprising:
   at least four first-tier clamping members, each of the first-tier clamping members including a front clamping surface, a rear radius surface, a bottom surface, a top surface, and a recessed ledge formed adjacent to the rear radius surface and the bottom surface, the recessed ledge being a recession from the rear radius surface to an inner radius, the inner radius being less than the rear radius surface, the recessed ledge being closer to the bottom surface than the top surface;
   at least two second-tier bow members, each of the second-tier bow members including a first concave surface, a second concave surface, a rear radius surface, a bottom surface, a recessed ledge formed adjacent to the rear radius surface and the bottom surface, and a protruded ledge formed adjacent to the bottom surface and each of the first and second concave surface, the recessed ledge being a recession from the rear radius surface to an inner radius, the inner radius being less than the rear radius surface, the first concave surface and the second concave surface magnetically coupled to a corresponding rear radius surface of a respective first-tier clamping member of the at least four first-tier clamping members, the protruded ledge configured to concentrically receive the recessed ledge of a respective first-tier clamping member; and
   at least one third-tier bow member, each third-tier bow member of the at least one third-tier bow member including a first concave surface, a second concave surface, a rear radius surface, a bottom surface, and a protruded ledge formed adjacent to the bottom surface and each of the first and second concave surface, the first concave surface and the second concave surface of the third-tier bow member magnetically coupled to a corresponding rear radius of a respective second-tier bow member of the at least two second-tier bow members, the protruded ledge of the third-tier bow member configured to concentrically receive the recessed ledge of a respective second-tier bow member.

2. The morphing jaw of claim 1, wherein the bottom surface of the at least one third-tier bow member further comprises a dowel pin hole configured for receiving a dowel pin for pivotal coupling with the vise.

3. The morphing jaw of claim 1, wherein each of the rear radius surfaces of the at least four first-tier clamping members further comprises a magnet.

4. The morphing jaw of claim 3, wherein each of the rear radius surfaces of the at least two second-tier bow members further comprises a magnet.

5. The morphing jaw of claim 4, wherein the first concave surface and the second concave surface of the at least one third-tier bow member each further comprises a magnet.

6. The morphing jaw of claim 5, further comprising a fourth-tier bow member comprising a first concave surface, a second concave surface, a rear radius, and a bottom surface;
   wherein the at least four first-tier clamping members comprises eight first-tier clamping members, the at least two second-tier bow members comprises four second-tier bow members, and the at least one third-tier bow member comprises two third-tier bow members; and
   the first concave surface and the second concave surface of the fourth-tier bow member magnetically coupled to a corresponding rear radius of a respective one of the two third-tier bow members, the first concave surface and the second concave surface each including a protruded ledge located proximate to the bottom surface, each protruded ledge of the fourth-tier bow member configured to concentrically receive a recessed ledge of a respective third-tier bow member.

7. The morphing jaw of claim 6, wherein the bottom surface of the fourth-tier bow member further comprises a dowel pin hole configured for receiving a dowel pin for pivotal coupling with the vise.

8. The morphing jaw of claim 6, wherein the first concave surface and the second concave surface of the fourth-tier bow member each further comprise a magnet.

9. The morphing jaw of claim 1, further comprising:
   each of the first-tier clamping members including a circumferential groove on the rear radius surface, wherein the recessed ledge of the respective first-tier clamping member defines a portion of the circumferential groove;
   each of the second-tier bow members including a circumferential protrusion on each of the first concave surface and the second concave surface, wherein the protruded ledge of the respective first concave surface and the second concave surfaces each define a portion of a respective circumferential protrusion, each of the second-tier bow members including a circumferential groove on the rear radius surface, wherein the recessed ledge of the respective second-tier bow member defines a portion of the circumferential groove of the second-tier bow member; and
   each of the third-tier bow members including a circumferential protrusion on each of the first concave surface and the second concave surface of the third-tier bow members, wherein the protruded ledge of the respective first concave surface and the second concave surfaces each define a portion of a respective circumferential protrusion, each of the third-tier bow members including a circumferential groove on the rear radius surface, wherein the recessed ledge of the respective third-tier bow member defines a portion of the circumferential groove of the third-tier bow member.

10. A morphing jaw for use with a vise, the morphing jaw comprising:
- at least four first-tier clamping members, each of the first-tier clamping members including a front clamping surface, a rear radius surface, and a bottom surface, the rear radius surface including a circumferential groove, the circumferential groove being a recession from the rear radius surface to an inner radius, the inner radius being less than the rear radius surface, the rear radius surface including a magnet that is separate and offset from the circumferential groove;
- at least two second-tier bow members, each of the second-tier bow members including a first concave surface, a second concave surface, a rear radius surface, and a bottom surface, the rear radius surface including a circumferential groove, the circumferential groove being a recession from the rear radius surface to an inner radius, the inner radius being less than the rear radius surface, the rear radius surface including a magnet that is separate and offset from the circumferential groove, the first concave surface and the second concave surface magnetically coupled to a corresponding rear radius surface of a respective first-tier bow member of the at least four first-tier clamping members via the corresponding magnet of the at least four first-tier clamping members, the first concave surface and the second concave surface each including a circumferential protrusion, each circumferential protrusion configured to receive the circumferential groove of a respective first-tier clamping member; and
- at least one third-tier bow member, each third-tier bow member of the at least one third-tier bow member including a first concave surface, a second concave surface, a rear radius surface, and a bottom surface, the first concave surface and the second concave surface of the third-tier bow member magnetically coupled to a corresponding rear radius of a respective second-tier bow member of the at least two second-tier bow members via the corresponding magnet of the at least two second-tier bow members, the first concave surface and the second concave surface each including a circumferential protrusion, each circumferential protrusion of the third-tier bow member configured to receive the circumferential groove of a respective second-tier bow member,
- wherein the at least one third-tier bow member includes a dowel pin hole configured for receiving a dowel pin for pivotal coupling with the vise, the dowel pin hole located on the bottom surface of the third-tier bow member and symmetrically between the first concave surface and the second concave surface the third-tier bow member, and
- wherein the second-tier bow member and the first-tier bow member are holeless and dowelless.

11. The morphing jaw of claim 10, wherein the first concave surface and the second concave surface of the at least one third-tier bow member each further comprises a magnet.

12. The morphing jaw of claim 11, further comprising a fourth-tier bow member comprising a first concave surface, a second concave surface, a rear radius, and a bottom surface;
- wherein the at least four first-tier clamping members comprises eight first-tier clamping members, the at least two second-tier bow members comprises four second-tier members, and the at least one third-tier member comprises two third-tier bow members; and
- the first concave surface and the second concave surface of the fourth-tier bow member magnetically coupled to a corresponding rear radius of the at least one third-tier bow members, the first concave surface and the second concave surface each including a circumferential protrusion, each circumferential protrusion configured to receive a circumferential groove of a respective third-tier bow member.

13. The morphing jaw of claim 12, wherein the bottom surface of the fourth-tier bow member further comprises a dowel pin hole configured for receiving a dowel pin for pivotal coupling with the vise.

14. The morphing jaw of claim 12, wherein the first concave surface and the second concave surface of the fourth-tier bow member each further comprise a magnet.

15. A morphing jaw for use with a vise, the morphing jaw comprising:
- first-tier clamping members, each of the first-tier clamping members including a front clamping surface, a rear radius surface, a bottom surface, a top surface, and a recessed ledge formed adjacent to the rear radius surface and the bottom surface, the recessed ledge being a recession from the rear radius surface to an inner radius, the inner radius being less than the rear radius surface, the recessed ledge being closer to the bottom surface than the top surface;
- second-tier bow members, each of the second-tier bow members including a first concave surface, a second concave surface, a rear radius surface, a bottom surface, a recessed ledge formed adjacent to the rear radius surface and the bottom surface, and a protruded ledge formed adjacent to the bottom surface and each of the first and second concave surface, the recessed ledge being a recession from the rear radius surface to an inner radius, the inner radius being less than the rear radius surface, the first concave surface and the second concave surface magnetically coupled to a corresponding rear radius surface of a respective first-tier bow member of the at least one of the first-tier clamping members, the protruded ledge configured to concentrically receive the recessed ledge of a respective first-tier clamping member; and
- at least one third-tier bow member, the third-tier bow member including a first concave surface, a second concave surface, a rear radius surface, a bottom surface, and a protruded ledge formed adjacent to the bottom surface and each of the first and second concave surface, the first concave surface and the second concave surface of the third-tier bow member magnetically coupled to a corresponding rear radius of a respective second-tier bow member of the at least one of the second-tier bow members, the protruded ledge of the third-tier bow member configured to concentrically receive the recessed ledge of a respective second-tier bow member.

16. The vise assembly of claim 15, wherein the bottom surface of the at least one third-tier bow member further comprises a dowel pin hole, wherein the dowel pin hole is configured for receiving a dowel pin for pivotal coupling with the vise.

17. The vise assembly of claim 15, wherein each morphing jaw further comprises a fourth-tier bow member including a first concave surface, a second concave surface, a rear radius, and a bottom surface;
- wherein the at least four first-tier clamping members comprises eight first-tier clamping members, the at least two second-tier bow members comprises four second-tier bow members, and the at least one third-tier bow member comprises two third-tier bow members;

the first concave surface and the second concave surface of the fourth-tier bow member magnetically coupled to a corresponding rear radius of a respective third-tier bow member of the at least one third-tier bow member, the first concave surface and the second concave surface each including a protruded ledge located proximate to the bottom surface, each protruded ledge of the fourth-tier bow member configured to concentrically receive a recessed ledge of a respective third-tier bow member.

* * * * *